United States Patent [19]

Anderegg et al.

[11] Patent Number: 5,669,999

[45] Date of Patent: Sep. 23, 1997

[54] METHOD OF MANUFACTURING A VEHICLE STRUCTURE

[75] Inventors: Kurt Anderegg, Rheineck; Guido Oesch, Rorschacherberg; Andreas Stettler, Lutzenberg, all of Switzerland

[73] Assignee: Inventio AG, Hergiswill, Switzerland

[21] Appl. No.: 489,500

[22] Filed: Jun. 12, 1995

[30] Foreign Application Priority Data

Jun. 14, 1994 [CH] Switzerland .................... 01871/94

[51] Int. Cl.⁶ .................... B65H 81/00; B61D 17/04
[52] U.S. Cl. .................... 156/173; 156/169; 105/396; 105/397; 296/901
[58] Field of Search .................... 156/169, 173, 156/172, 175; 105/396, 397; 296/901

[56] References Cited

U.S. PATENT DOCUMENTS

| | | | |
|---|---|---|---|
| 4,025,675 | 5/1977 | Jonda | 428/116 |
| 5,362,345 | 11/1994 | Stettler et al. | |
| 5,365,662 | 11/1994 | Anderegg | 29/897.2 |

FOREIGN PATENT DOCUMENTS

| | | | |
|---|---|---|---|
| 0582544 | 2/1994 | European Pat. Off. | |
| 2700729 | 7/1994 | France | 156/172 |
| 1490575 | 11/1977 | United Kingdom | |

*Primary Examiner*—Jeff H. Aftergut
*Attorney, Agent, or Firm*—Howard & Howard

[57] ABSTRACT

A method for producing vehicle structures such as railway coach bodies includes winding layers and integral annular frame elements of like material. The resulting body is free of metal can include additional longitudinal stiffening elements inserted between the annular frame elements. Windows covered by protective foils are installed in an insulating layer between the wound layers during the winding process. At the conclusion of the winding process, the portions of the inner and outer wound layers covering the windows are removed and the window openings are finished by inserting a reinforcing frame on the outer wound layer and an angle frame on the inner wound layer.

14 Claims, 4 Drawing Sheets

METHOD OF MANUFACTURING A VEHICLE STRUCTURE

BACKGROUND OF THE INVENTION

The present invention relates generally to a vehicle structure and, in particular, to a railway coach body and the method of manufacturing such a body.

A coach body, which is produced in a winding process and has an inner wound layer with partly molded-in, projecting and encircling stiffening ribs, a wound-in stiffening rib of metal and cut-outs between the inner and the outer wound layer for the reception of ventilation, heating, electrical installations, illumination and sanitary equipment, is shown in the British patent specification GB 1 490 575. The simple sandwich buildup of an inner wound layer, intermediate insulation and an outer wound layer forms the self-supporting structure of the coach body.

The U.S. Pat. No. 5,362,345 describes a similar process for the production of a coach body by a winding technique. In addition to a reinforcing rib, special longitudinal profiles are positioned at the upper and lower corners and are wound into the body. Also, blank covers corresponding to window and door openings to be cut out later are wound into the body. This self-supporting lightweight structure includes a thin first inner insulation layer as well as a second outer insulation layer which is of the thickness of the reinforcing profiles.

In both of the above described known processes, the insulation layers are interrupted by partial thermal bridges in the form of the wound-in metallic reinforcing parts. Furthermore, the coupling of basically different materials entails the risks of wound layer detachment and corrosion as a consequence of expansion forces arising in the case of temperature fluctuations. Moreover, a reinforcing rib to be produced separately represents a conceptional foreign body which disturbs or makes impossible a continuous sequence of the manufacturing process.

SUMMARY OF THE INVENTION

The present invention concerns a method of manufacturing a self-supporting lightweight railway coach body. The method includes the steps of: a. winding a fiber reinforced synthetic material as an inner wound layer about a longitudinal axis of the body; b. applying an inner insulation layer over the inner wound layer; c. forming grooves in the inner insulation layer; d. inserting cable channels in the grooves; e. winding a fiber reinforced synthetic material as a middle wound layer over the inner insulation layer and the cable channels; f. placing ceiling ventilation channels on the middle wound layer at an upper wall of the body; g. mounting windows and longitudinal stiffening members for the absorption of buffer forces on the middle wound layer at side walls of the body; h. applying an outer insulation layer over the middle wound layer; i. winding annular frame elements over the middle layer adjacent the windows; and j. winding a fiber reinforced synthetic material as an outer wound layer over the outer insulation layer and the annular frame elements. After the winding is completed, the portions of the inner and outer wound layers covering the windows are removed and the window openings are finished by inserting a reinforcing frame on the outer wound layer and an angle frame on the inner wound layer.

The method according to the present invention results in a vehicle structure in the shape of a cylindrical longitudinal body formed of a plurality of layers of fiber reinforced synthetic materials wound about a longitudinal axis of the body; a plurality of cable channels and ventilation channels positioned between adjacent ones of the wound layers; and a plurality of annular frame elements positioned between adjacent ones of the wound layers at spaced apart positions and wound about the longitudinal axis of said body. The body also includes windows positioned between the outer and the middle wound layers. The windows can be formed with an inner frame surrounded by an outer frame, the inner and outer frames being connected by a glued joint. The reinforcing frame bears on adjacent ones of the annular frame elements, rests on the outer layer and covers the window inner and outer frames and the joint. The angle frame rests on the inner wound layer and covers the window inner frame and the joint. The annular frame elements are formed as a hollow profile having an inner frame element web, a frame element core positioned over a portion of the inner frame element web, a frame element flange positioned on either side of the frame element core and over the inner frame element web and an outer frame element web positioned over the frame element core and the frame element flanges.

It is an object of the present invention to enable the economical production of a coach body structure.

Advantages of the present invention are that the build-up of the self-supporting structure consists of materials of like kind, the effort for installing the window assembly is reduced and the thermal insulation of the coach body is improved.

Further advantages are that the strength of the vehicle structure can be adapted to the respective requirements by the method steps and the selection of material and that the strength of the structure can be influenced still further by means of external and internal reinforcing elements.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
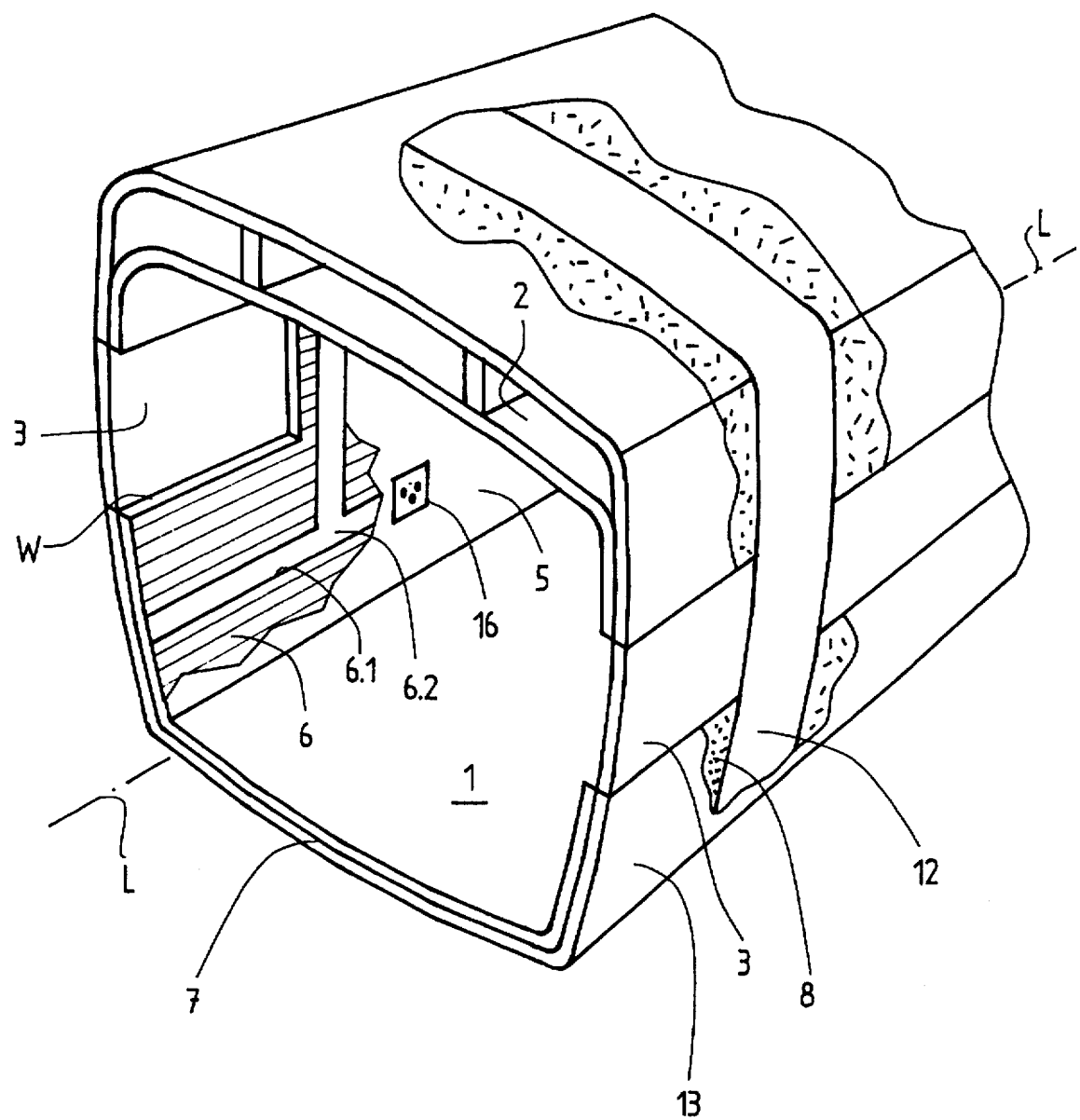
FIG. 1 is a fragmentary perspective view of a coach body in accordance with the present invention.

In the FIG. 1, there is shown a vehicle, structure 1, such as a railway coach body, produced by winding techniques.

The structure 1 is wound about its longitudinal axis L on a form (not shown) such as the mandrel shown in the U.S. Pat. No. 5,362,345. An internal surface of the vehicle structure 1 is formed by an inner wound layer 5. An inner insulation layer 6 is applied over an outer surface of the inner wound layer 5 and has grooves 6.1 formed therein into which cable channels 6.2 are inserted. Superposed on the cable channel 6.2 is an apparatus connection 16 which is mounted in one side wall of the layer 5. Covering an outer surface of the inner insulation layer 6 is a middle wound layer 7. Formed above an upper side of the layer 7 are ventilation ceiling channels 2 in the form of a one-piece synthetic material profile. The channels 2 and 6.2 can be formed of the same or similar material to that used for the wound layers 5 and 7. A coach window opening W can be formed in the side wall through the layers 5, 6 and 7. An outer insulation layer 8 is positioned over an outer surface of the middle layer 7. An outer frame element web 12 of a wound-in annular frame element is positioned between the windows openings W. An outer wound layer 13 forms the outer skin of the vehicle structure 1. The window openings extend through the layers 8 and 13, but are closed by prefabricated windows 3.

Figure 2:
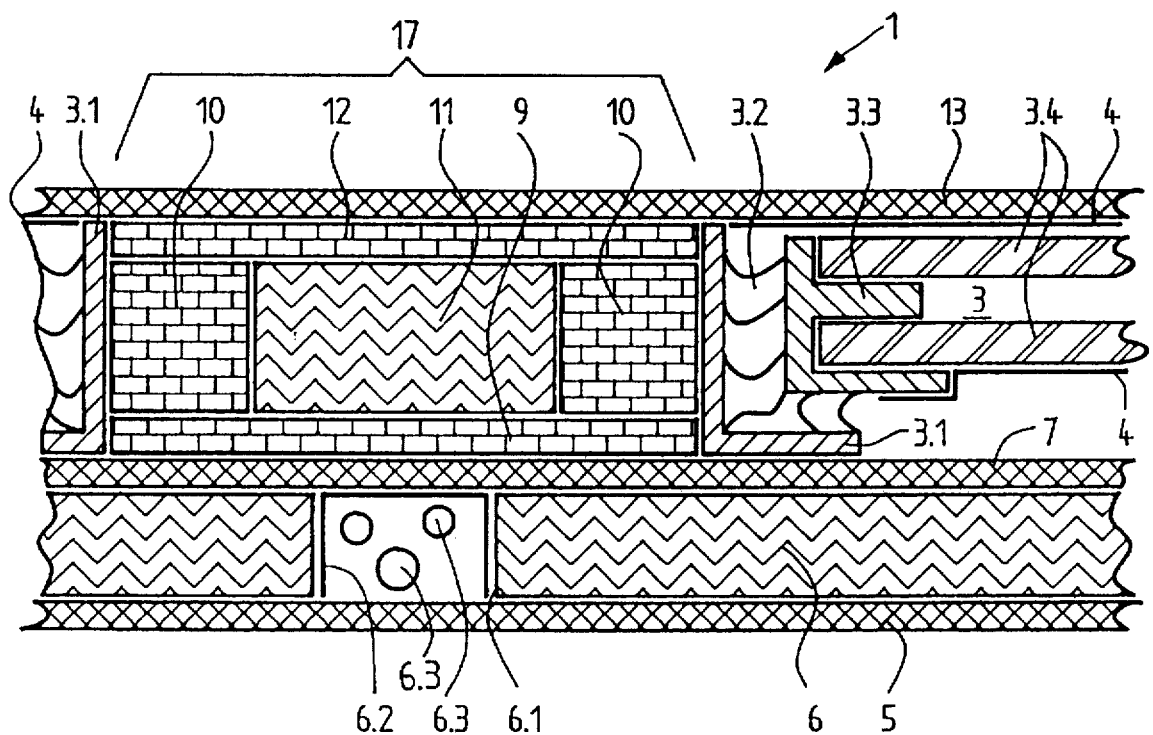
FIG. 2 is an enlarged fragmentary cross-sectional view of the coach body shown in the FIG. 1 with a window and an annular frame element installed.

The FIG. 2 is an enlarged section through the window region of the vehicle structure 1 shown in the FIG. 1. The first or inner wound layer 5 can have a thickness of, for example, two to five millimeters. It preferably consists of resin-impregnated glass fiber layers in the form of rovings and fleeces. The inner insulation layer 6 which is laid and glued onto the outer surface of the inner wound layer 5, is a few centimeters thick and can be made of a synthetic foam material of stable shape, elastic in bending and stiff to pressure. In this inner insulation layer 6, the grooves 6.1 are formed, cut or milled out, and then equipped with the cable channels 6.2. Cables are run through the cable channels 6.2 which are preferably open in the direction towards the inner wound layer 5 and closed in the direction to the middle wound layer 7. The depth of the cable channels 6.2 corresponds to the thickness of the inner insulation layer 6 for the purpose of obtaining a planar bearing surface for the middle wound layer 7. With the addition of the middle wound layer 7, a first sandwich build-up of the vehicle structure 1 is concluded.

Figure 3:
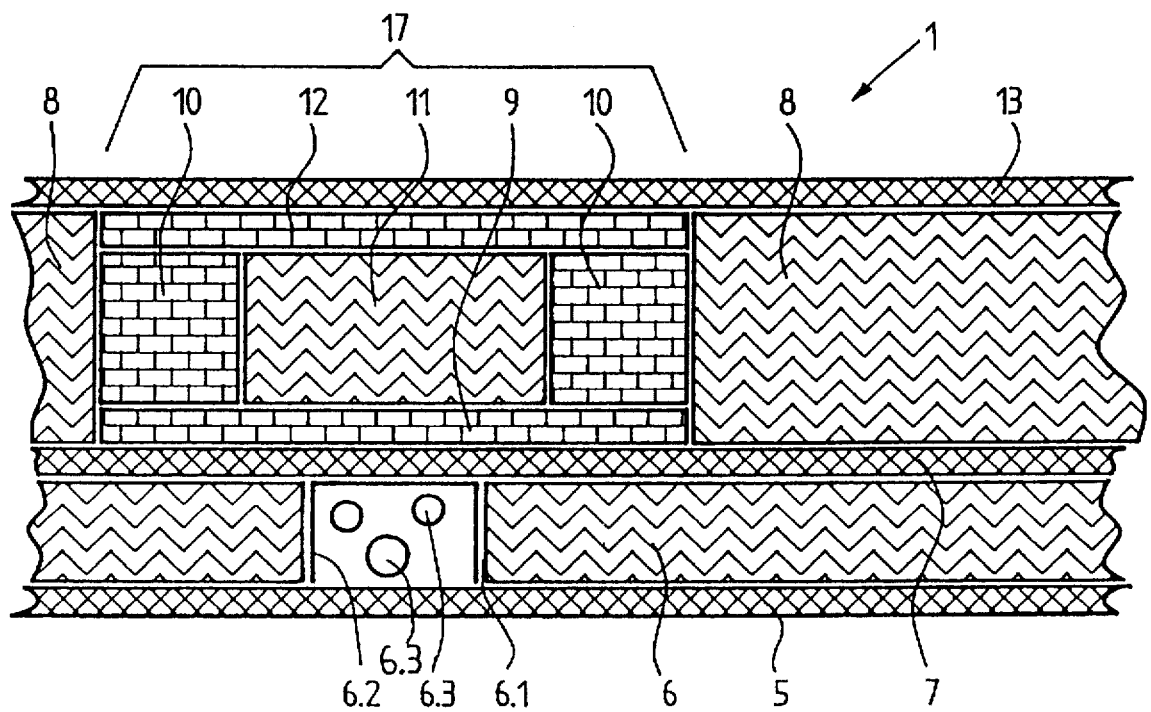
FIG. 3 is an enlarged fragmentary cross-sectional view of the coach body shown in the FIG. 1 outside the window region with an annular frame element installed.

During the next method step, the prefabricated windows 3 are laid onto the middle wound layer 7 and fixed in their final position. The windows 3 consist of an outer frame 3.1, an inner frame 3.3 connected to the outer frame by a glued joint 3.2 and a double glazing 3.4 inserted into the inner frame. The outer surfaces and the inner surfaces of the windows 3 are each covered by an easily removable protective foil material 4. The surface above and below the windows 3 is filled out, as illustrated in the FIG. 3, all around the vehicle structure 1 by the outer insulating layer 8 of the same thickness as the outer window frames 3.1

In the next method step, an annular frame element 17, which reinforces the structure 1, is wound into the now encircling free channel of constant width of a window post. As a first element of the annular frame element 17, an inner frame element web 9 is wound into the channel base in the shape of a multi-layer winding. In the middle of the inner frame element web 9, a frame element core 11 is then inserted, the width of which, for example, is half of the channel width and which consists of a light core material of stable shape. The height of the frame element core 11 is a few millimeters less than the thickness of the windows 3. Frame element flanges 10 are wound into the channels on either side of and to the same height as the frame element core 11.

The outer frame element web 12 is wound as a concluding part of the annular frame element 17 onto the insulating layer core 11 and both of the lateral frame element flanges 10. The annular frame element 17 forms a rectangular profile reinforcing the structure 1 by a stiffening core of great strength. A strength comparable with a metallic annular frame element is achieved through the appropriate choice of material. For example, carbon fibre webs impregnated with special resin are processed as high-strength material for the annular frame element 17. The wound-in annular frame element 17, together with the outer insulating layer 8 and the outward side of the windows 3, forms a uniform planar surface as a base for the outer wound layer 13 terminating the structure.

Figure 4:
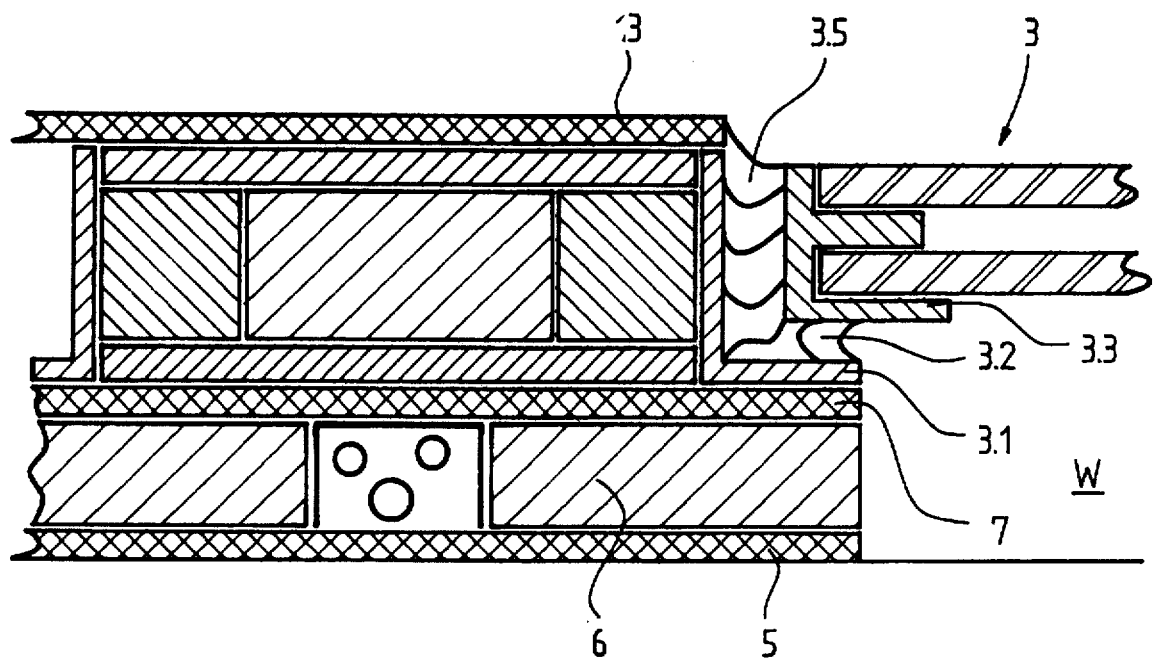
FIG. 4 is a view similar to the FIG. 2 with the window surfaces exposed.

There is shown in the FIG. 4 a detail of how the windows 3, which are covered over by the outer wound layer 13 after the conclusion of the winding operations, are exposed by cutting out the outer wound layer. After removal of the protective foil 4 and installation of a terminating joint 3.5, the outer side of the structure 1 is finished to a large extent. On the inner side, the structure layers 5, 6 and 7 must be severed through to the facing surface of the inner frame 3.3 to form the window opening W to coincide with the outline of the window 3 or extend flush with the inward edge of the outer frame 3.1 in order to expose the inwardly facing side of the window from which the protective foil 4 can be removed.

Figure 5:
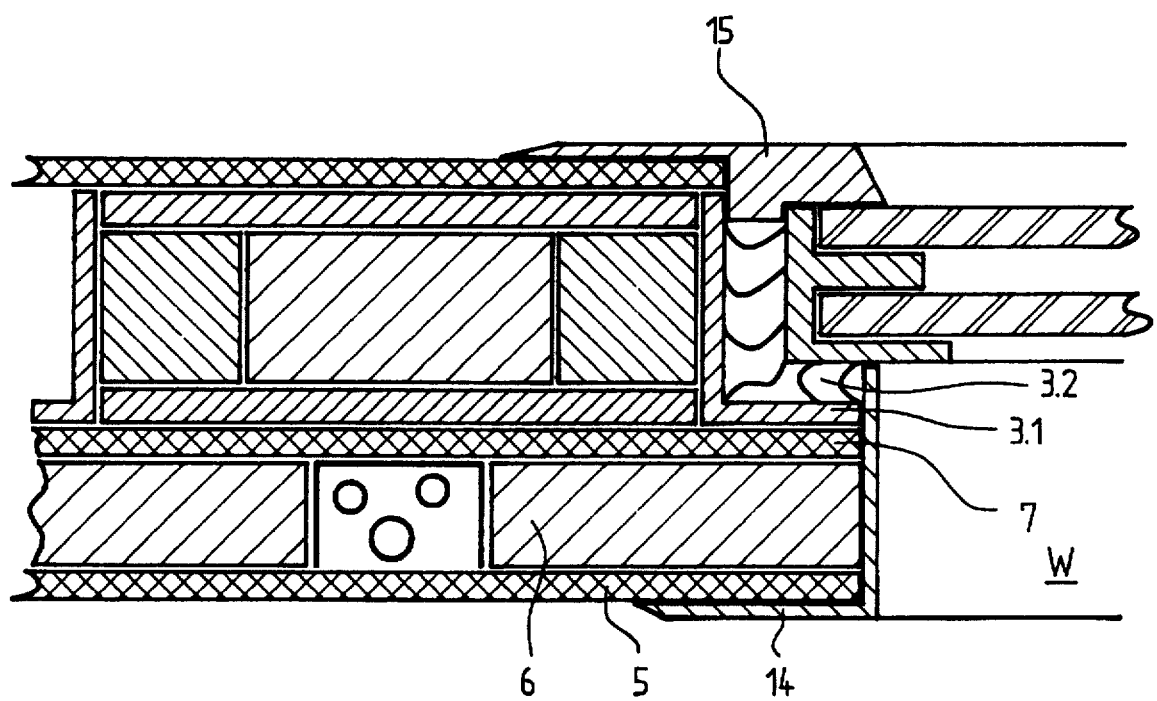
FIG. 5 is a view similar to the FIG. 4 with an angle frame and a reinforcing frame installed.

An angle frame 14, which covers the inner wound layer 5 by a few centimeters, is shown in the FIG. 5 as being inserted on the inner side of the structure 1 for covering the cut surfaces of the severed-through structure layers 5, 6 and 7, the outer angle 3.1 and the glued joint 3.2. A reinforcing frame 15 is inserted on the outer side of the structure 1 at the window 3 as an additional element. Increased demands in respect of strength and finish of the outer skin of the vehicle structure 1 can be fulfilled by the reinforcing frame 15.

Figure 6:
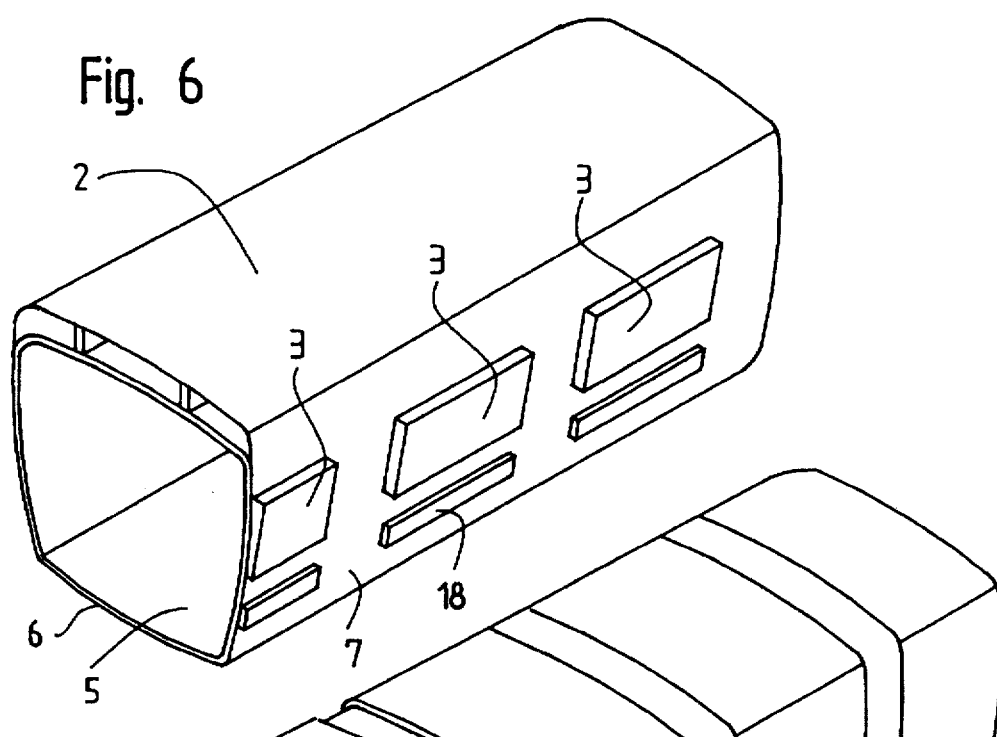
FIG. 6 is a perspective view of the coach body shown in the FIG. 1 in an initial fabrication stage with glued-on windows.

In the FIG. 6 there is shown the vehicle structure 1 in an intermediate stage essential for the method according to the present invention. Here, the first sandwich structure consisting of the inner wound layer 5, the inner insulation layer 6 and the middle wound layer 7 is present. The prepared shaped profile with the ceiling channels 2 is placed onto the upper wall and the windows 3 are mounted in their final position on the side walls. If the vehicle structure 1 is for use as a coach body of a rail vehicle, prefabricated longitudinal stiffening elements 18 are fastened on each side wall at the height of a buffer plane. Through these longitudinal stiffening elements 18, one obtains the pressure strength which is required for a rail vehicle parallel to the longitudinal direction of the vehicle. The longitudinal stiffening elements 18 are in terms of material and process similar to the annular frame elements 17 and for that reason also display the same mechanical strength. The elements 18 are constructed substantially as wound hollow rectangular profiles or extrusion profiles with a foamed filled cavity, each displaying the length of a window 3 and abutting at the ends the annular frame elements 17. The longitudinal stiffening elements 18, if needed, are inserted in longitudinal direction at other locations between the annular frame elements 17 such as, for example, in the floor region and the ceiling region and at the corner portions of the vehicle structure 1. The vehicle structure 1, with the contiguous reinforcing framework which is incorporated during the winding process and consists of the annular frame elements 17 and longitudinal stiffening elements 18, the inserted windows 3 with the reinforcing frame 14, the ceiling channels 2, the three wound layers 5, 7 and 13 and the insulating layers 6 and 8, displays a very great stiffness and strength with a high quality of the thermal and acoustic insulation.

Figure 7:
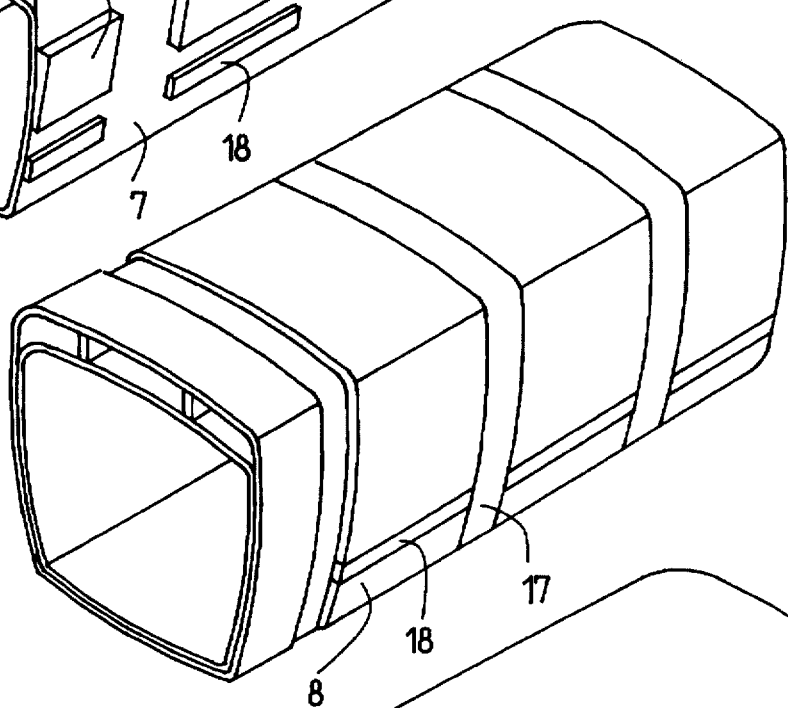
FIG. 7 is a perspective view similar to the FIG. 6 after further fabrication steps.
Figure 8:
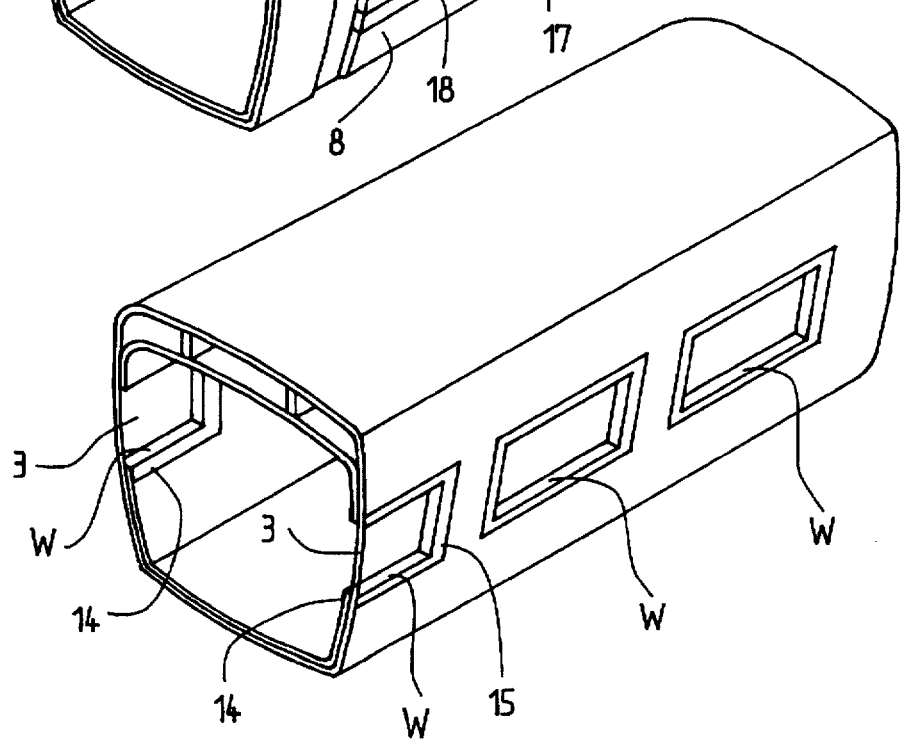
FIG. 8 is a perspective similar to the FIG. 7 upon conclusion of the manufacturing method according to the present invention.

In the FIG. 7, the intermediate spaces between the windows 3 and the longitudinal stiffening elements 18 are filled in by the outer insulating layer 8 and two of the three annular frame elements 17 are wound in. At the front end (left side of the FIG. 7) of the structure 1, the empty, recessed channel for a third one of the annular frame elements 17 is visible. For reasons of space, only a partial length portion of a vehicle structure 1 is illustrated in the FIGS. 6 to 8. Annular frame elements 17 are inserted not only between the windows 3, but additionally where a structural reinforcement is sensible and necessary such as, for example, at door posts to be used as a carrier element for the door mechanism and as rim stiffening at coach body ends for the attachment of end walls and driver cabins. In the FIG. 8, there is shown the finished vehicle structure 1 with the inserted reinforcing frame 15 and angle frame 14.

The result of the method according to the present invention is a double sandwich structure with the inner insulating layer 6, which incorporates the cable channels 6.2 and is closed off by the inner wound layer 5 and the middle wound layer 7, and the outer insulating layer 8, which receives the stiffening annular frame elements 17 and the longitudinal stiffening elements 18 as well as the windows 3 and the ceiling channels 2, and which is finally covered by the outer wound layer 13. The cable channels 6.2 can be drilled from the inner side at predetermined locations and the apparatus connections 16 can be constructed to include, for example, illumination and audio devices and electrical outlets for passenger carried devices such as razors, personal computers, dictating machines, typewriters and so forth. In case of need, the above described reinforcing frames 15 can be inserted at the outward side of the windows 3. The inner portion of the frame 15 projecting into the glued joint absorbs additional longitudinal forces in force-locking connection with the annular frame elements 17 and the external visible portion results in an aesthetically and mechanically satisfactory covering of the frame portion of the window 3 and of the cut-out in the outer wound layer 13.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of manufacturing a self-supporting lightweight vehicle structure comprising the steps of:
   a. winding a fiber reinforced synthetic material on a vehicle structure winding form about a longitudinal axis of the winding form forming an inner layer portion of a hollow vehicle structure;
   b. applying an inner insulation layer over the inner layer portion, forming grooves in said inner insulation layer and inserting at least one cable channel in said grooves;
   c. winding a fiber reinforced synthetic material on the winding form over the cable channel and about the inner insulation layer forming a generally planar middle layer portion of the hollow vehicle structure;
   d. winding at least two annular frame elements on a generally planar outer surface of the middle layer at spaced apart positions along the longitudinal axis of the winding form, the annular frame elements being formed of a synthetic material;
   e. winding a fiber reinforced synthetic material on the winding form over the annular frame elements and about the middle layer forming an outer layer portion of the hollow vehicle structure; and
   f. removing the hollow vehicle structure from the winding form.

2. The method according to claim 1 including performing said step d. by winding each annular frame element as a hollow profile with a wound inner frame element web, a center frame element core on top of the inner frame element web, a wound frame element flange on either side of the frame element core and a wound outer frame element web on top of the frame element core and the frame element flanges.

3. The method according to claim 1 including performing said step d. by locating a plurality of window openings spaced apart along the longitudinal axis of the winding form and positioning one of the annular frame elements between adjacent ones of the window openings.

4. The method according to claim 1 including performing said step d. by positioning the annular frame elements at points on the winding form corresponding to a door post region and opposite ends of the hollow vehicle structure.

5. The method according to claim 1 including a step of inserting longitudinal stiffening members for the absorption of buffer forces between adjacent ones of the layers during said step d.

6. The method according to claim 1 including installing windows between the middle layer and the outer layer during said step d.

7. The method according to claim 6 including a step of removing a portion of the outer layer of the hollow vehicle structure to expose each of the windows and inserting a reinforcing frame at each of the windows which reinforcing frame bears on the adjacent annular frame elements and rests on the outer layer.

8. The method according to claim 7 wherein each of the windows is formed with an inner frame surrounded by an outer frame, the inner and outer frames being connected by a glued joint, and the reinforcing frame is inserted to cover the window frames and the joint.

9. The method according to claim 6 including a step of removing a portion of the inner layer of the hollow vehicle structure to expose each of the windows and inserting an angle frame at each of the windows which angle frame rests on the inner layer.

10. The method according to claim 9 wherein each of the windows is formed with an inner frame surrounded by an outer frame, the inner and outer frames being connected by a glued joint, and the angle frame is inserted to cover the inner frame and the joint.

11. A method of manufacturing a self-supporting lightweight railway coach body comprising the steps of:
   a. winding a fiber reinforced synthetic material on a railway coach body winding form as an inner wound layer about a longitudinal axis of the winding form;
   b. applying an inner insulation layer over the inner wound layer;
   c. forming grooves in the inner insulation layer;
   d. inserting cable channels in the grooves;
   e. winding a fiber reinforced synthetic material as a middle wound layer over the inner insulation layer and the cable channels;
   f. placing ceiling channels on the middle wound layer at positions corresponding to an upper wall of a railway coach body;
   g. mounting windows on the middle wound layer at positions corresponding to side walls of a railway coach body;

h. applying an outer insulation layer over the middle wound layer;

i. winding annular frame elements over the middle layer adjacent the windows;

j. winding a fiber reinforced synthetic material as an outer wound layer over the outer insulation layer and the annular frame elements to form a railway coach body; and k. removing the railway coach body from the winding form.

12. The method according to claim 11 wherein the step g. includes mounting longitudinal stiffening members for the absorption of buffer forces on the middle wound layer.

13. The method according to claim 11 wherein the step i. includes for each of the annular frame elements the steps of:

k. winding an inner frame element web over the middle layer adjacent the windows;

l. inserting a frame element core in a middle portion of the inner frame element web, the frame element core having a width less than a width of the inner frame element web;

m. winding a frame element flange on either side of the frame element core; and n. winding an outer frame element web over the frame element core and the frame element flanges to complete the annular frame element.

14. The method according to claim 11 wherein the step i. includes winding each of the annular frame elements with a generally rectangular profile having a stiffening core.

* * * * *